4 Sheets—Sheet 1.

S. W. SHAW.
Dredging-Machine.

No. 220,180. Patented Sept. 30, 1879.

Witnesses
William Hoyd Duckett
D. B. Lawler

Inventor
Stephen W. Shaw
per J. L. Boone
Attorney

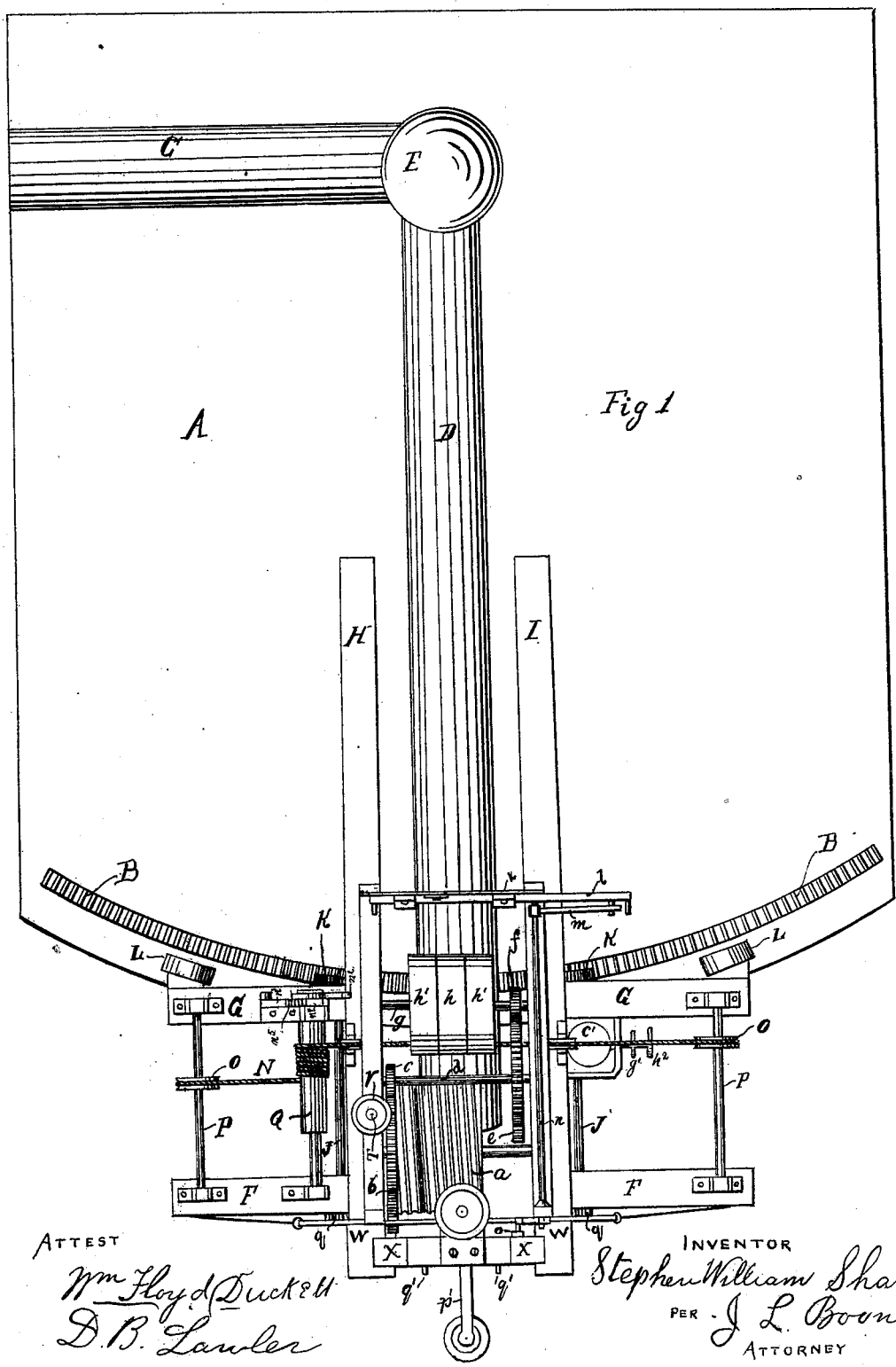

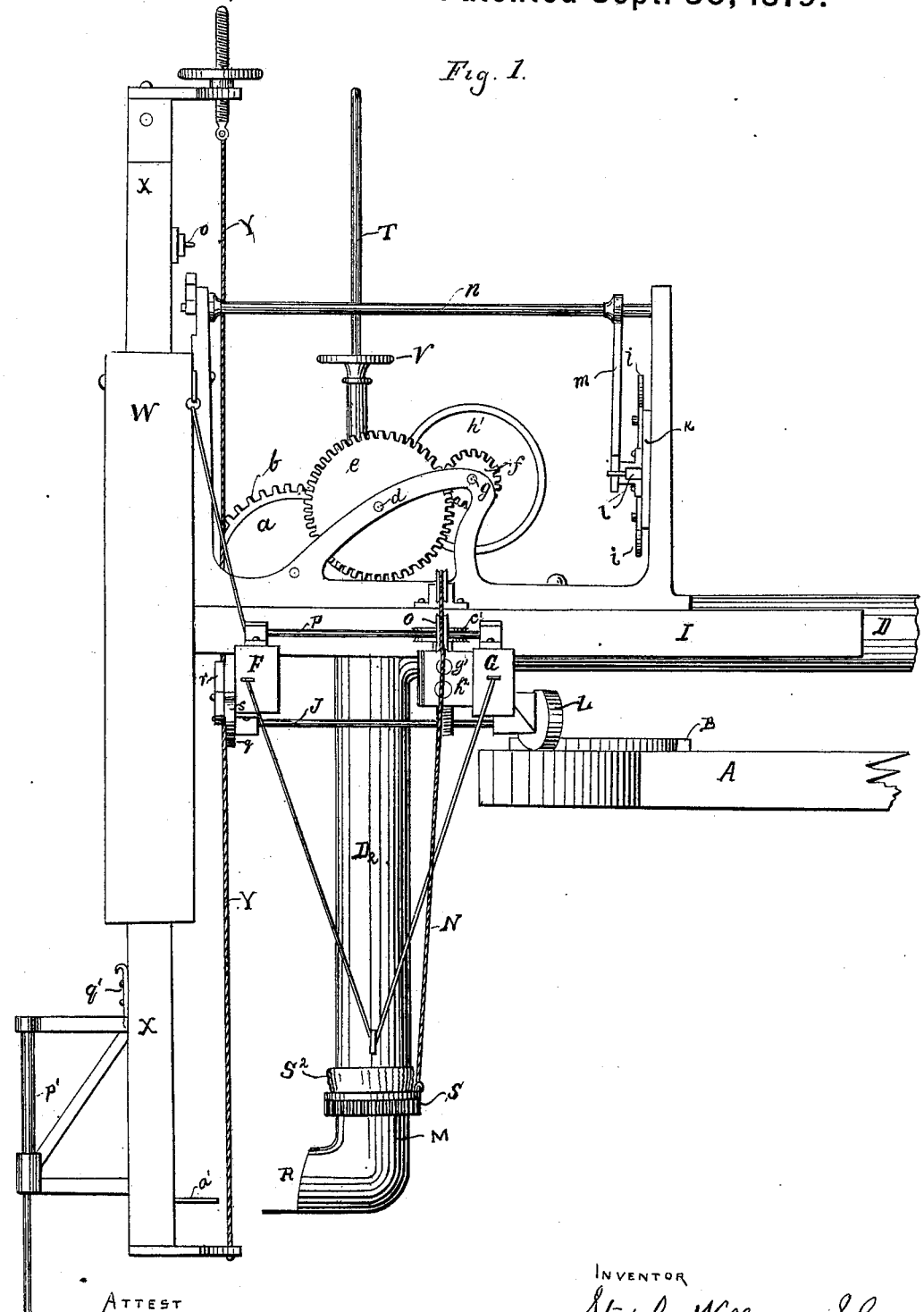

4 Sheets—Sheet 4.
S. W. SHAW.
Dredging-Machine.
No. 220,180. Patented Sept. 30, 1879.
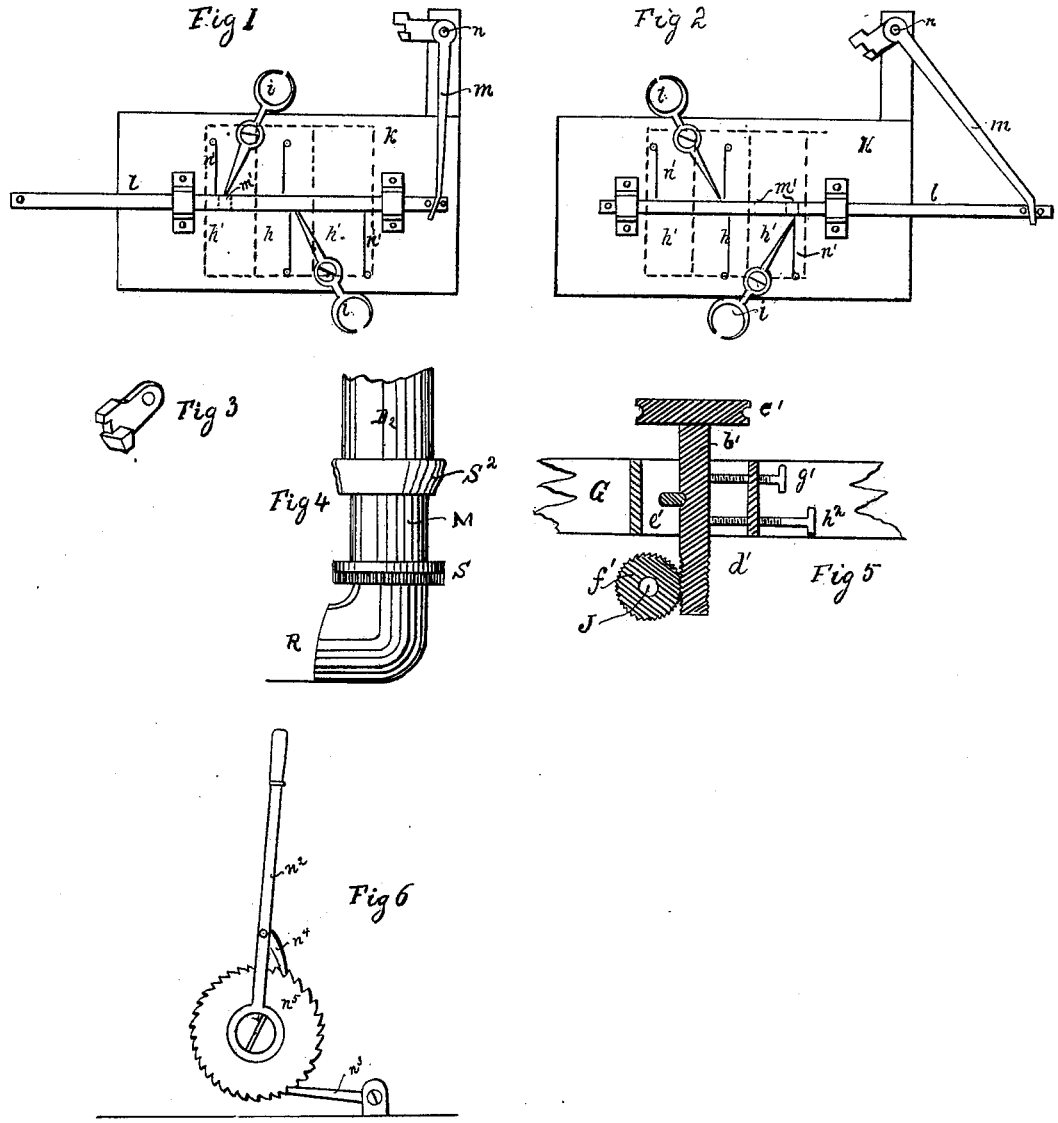
ATTEST
Wm Floyd Duckett
D. B. Lawler
INVENTOR
Stephen William Shaw
PER
J. L. Boone.
ATTORNEY

UNITED STATES PATENT OFFICE.

STEPHEN W. SHAW, OF SAN FRANCISCO, CALIFORNIA.

IMPROVEMENT IN DREDGING-MACHINES.

Specification forming part of Letters Patent No. 220,180, dated September 30, 1879; application filed December 27, 1878.

*To all whom it may concern:*

Be it known that I, STEPHEN WILLIAM SHAW, of the city and county of San Francisco, and State of California, have invented an Improved Dredging-Machine; and I do hereby declare that the following is a full, clear, and exact description thereof, reference being had to the drawings accompanying this specification and forming a part of the same.

My invention has reference to that class of dredgers in which suction or the power of a vacuum is used for raising the mud or other material through a telescopic suction-pipe, and forcing it through a suitable conduit to the place of deposit.

My invention consists, mainly, in the various novel combinations of the several parts composing my improved apparatus; and, further, in an improved means of packing the joint between the stationary and sliding sections of the suction-tube, as fully herein described and claimed.

Figure 1:
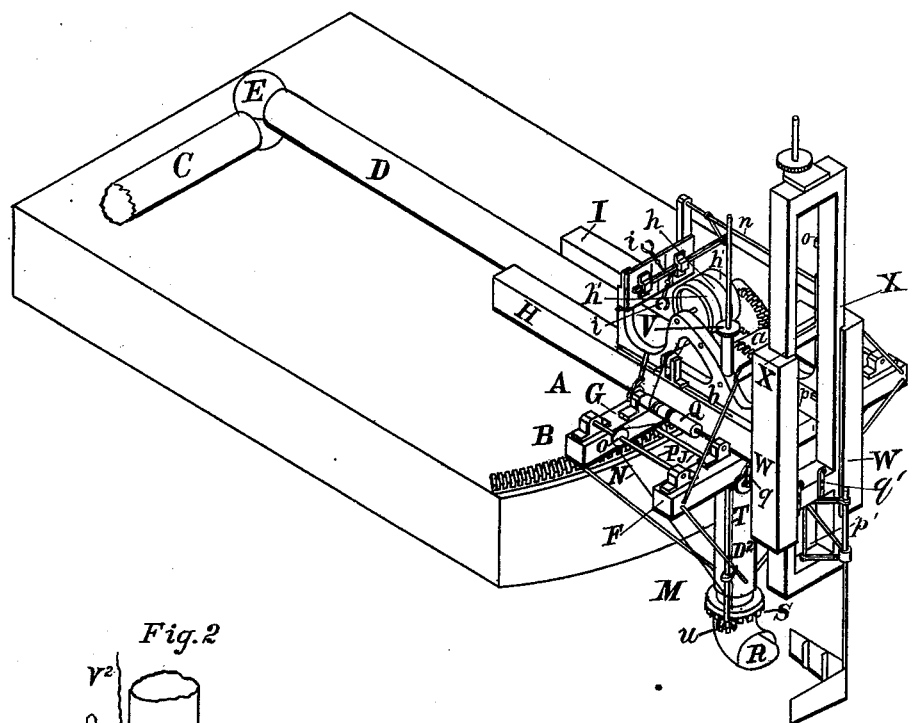
Figure 2:
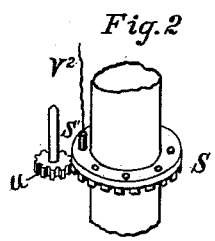
Figure 3:
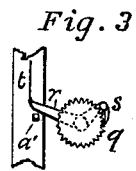

Referring to the accompanying drawings, Figure 1, Sheet 1, is a perspective view. Fig. 2, Sheet 1, is a detached view, showing revolving head of suction-pipe. Fig. 3, Sheet 1, is a detached view of the mechanism which moves the shaft $j$. Fig. 1, Sheet 2, is a plan view. Fig. 1, Sheet 3, is a side view. Figs. 1 and 2, Sheet 4, are detached views of the belt-shippers. Fig. 3, Sheet 4, is a perspective view of the crank on the rock-shaft. Fig. 4, Sheet 4, is a detached view of mouth-piece, showing rubber $S^2$. Fig. 5, Sheet 4, is a detached view of the worm-wheel for driving the carriage-frame. Fig. 6, Sheet 4, is a view of the lever, ratchet, and pawl for operating the windlass to raise and lower the telescopic part of the suction-pipe.

Let A represent a section of the deck of the scow, float, or vessel upon which the dredger is constructed. Upon this vessel I place the steam-vacuum cylinders or other vacuum or suction apparatus, which is used for creating the suction for raising the mud or other material through the suction-pipe. This apparatus I have not shown, as its construction and operation are too well known, and I make no changes in its ordinary application to adapt my improvements to it.

The portion of the deck which A represents may be either the bow or stern of the vessel, as my invention can be applied at either end.

In either case the end of the boat, scow, or vessel is made curved or rounded, as represented, and near its curved or rounded edge I secure a corresponding toothed rack, B, which extends the entire length of the curved end, the teeth or cogs being on its upper side. C is that portion of the suction-pipe which leads to the vacuum-cylinders or other suction apparatus, while D is the extension which leads to the end of the boat, and the extremity of which is bent downward outside of the boat, so as to form the upper part of the vertical suction-pipe $D^2$. This extension D is connected with the pipe C by a ball-and-socket or other joint, E, which will permit its outer end to move in a circle horizontally, and this joint is placed at the point or center from which the curve described by the rack B is drawn.

The outer end of this extension rests upon and is supported by the carriage which moves upon the rack B, and by which its outer end is carried back and forth across the width of the boat, scow, or vessel. This carriage consists of two short beams, F G, across which two other beams, H I, are secured transversely, as shown. A shaft, J, extends across underneath the beams F G, one on each side of the middle of the carriage, being supported in boxes on the under side of the beams.

On the inner end of each shaft J a toothed wheel, K, is placed, the teeth of which correspond with the teeth of the rack B. A plain wheel, L, which is arranged to move on the curved or rounded edge of the deck outside of the rack B, is mounted near each end of the beam G. I then place the carriage with the wheels L resting upon the edge of the boat, scow, or vessel, while the remainder of the carriage projects beyond the edge of the boat. The wheels L rest upon the edge of the boat outside of the rack, and the intermediate toothed wheels K engage with the rack.

The beams H I project to a considerable distance from the carriage over the deck of the vessel on the inner side, while the hinged extension D of the suction-pipe passes back between these beams, and also across the beam G of the carriage, and bends downward between two beams, F G, so as to pass down outside of the vessel, thus holding the carriage in position.

It will now be seen that the carriage is free to move back and forth around the curved edge of the boat, vessel, or scow, the suction-pipe bending at the joint E.

The vertical portion of the suction-pipe I make in two sections, the lower section, M, being telescopic in the upper section, so that it can be raised or lowered as required. A rope or chain, N, has one end attached to the lower end of the section M on each side, and passes up over a pulley, O, which is secured on a transverse shaft, P, at each end of the beams F G; thence they pass to a shaft or windlass, Q, around which they are wound in the same direction, so that they wind and unwind together. By unwinding the ropes from this windlass the lower section of the suction-pipe is extended to any desired depth, and by winding them up the section is elevated and the suction-pipe shortened. The windlass is necessarily placed on one end of the carriage, so that the rope which passes over the pulley O at the opposite end must be carried over pulleys properly placed to avoid the other mechanism. These ropes, extending outward at an angle and pulling in opposite directions, as they do, also serve as guys to brace and steady the suction-pipe against strains.

To the lower end of the section M, I secure the scoop or mouth-piece R, so that it can be rotated to present its mouth or scoop in any desired direction. It is made in the form of an elbow, and slips over the lower end of the section M, where it is secured, so that it can rotate independent of it. Around its upper edge I secure a circular rack or toothed ring, S.

A rod or vertical shaft, T, passes down through the carriage-frame, and down alongside the suction-pipe, being supported in suitable bearings attached to the suction-pipe, and has a toothed wheel, $u$, on its lower end, which engages with the toothed ring S. This rod is a sliding rod, and it passes through a hand-wheel, V, above the frame, through which it moves on a feather, so that by turning the hand-wheel the mouth-piece is rotated, and the rod slides up and down through the wheel as the section M is raised or lowered.

Holes are made at intervals in the toothed ring S, into which a spring-pin, $S^1$, enters when the suction-mouth has been set to the proper position. A cord, $V^2$, is attached to this pin, and extends up to the frame above, so that the pin can be drawn, when desired, by a person standing on the frame above.

For packing the joint between the stationary and telescopic pipes, I use an india-rubber or other ring, $S^2$, which encircles the lower end of the stationary pipe, and extends down against the moving pipe, so that the suction in the pipe will draw it close around the joint, and thus keep it tight.

To the outer end of each of the timbers H I, I secure an upright beam or timber, W, the inside face of which is formed into a way or guide.

X X are the sides of a sliding frame, which is arranged to move up and down between the ways W W. This sliding frame is of great length, and is arranged to carry a digger (to be hereinafter described) at its lower end, so that it can be lowered down and used to force the digger into the bottom which it is intended to dredge. This sliding frame is raised and lowered by power derived from an engine on board of the vessel in the following manner: A wire rope, chain, or cable, Y, has one end attached to a tightening-screw at the upper end of the frame, and passes down and is wound a number of times around a drum or cylinder, $a$, which is mounted on bearings between the timbers H I; thence it passes down, and its opposite end is secured to the lower end of the sliding frame, so that when the drum is rotated in one direction the sliding frame is raised, and when it is wound in an opposite direction the frame is lowered. The drum $a$ has a large spur-wheel, $b$, secured to it, which engages with a pinion, $c$, on a shaft, $d$, in front of it. On the opposite end of the shaft $d$ is another spur-wheel, $e$, which engages with a pinion, $f$, on the pulley-shaft $g$, thus gearing down the motion and increasing the power. On the pulley-shaft $g$, I have three pulleys—the tight pulley $h$ in the middle and a loose pulley, $h'$, on each side of it—and I run two belts from the engine onto these pulleys.

In order to render the operation of the machine automatic, I arrange two belt-shippers, $i$ $i$, and connect them by means of tripping devices, so that they are operated by the sliding frame X at each end of its stroke, as hereinafter specified.

In running two belts in opposite directions and shipping them onto the same tight pulley alternately it is necessary that the belt which is being shipped from the tight pulley be entirely clear of it before the other belt is shipped upon it. This necessitates a peculiar movement of the shippers. In my arrangement, $i$ $i$ represent the shippers.

Directly in front of the pulley-shaft a wide plate, $k$, is secured vertically, as shown, and to this plate the shippers are pivoted. A bar, $l$, is arranged to slide in bearings horizontally across the middle of this plate, one end of which is attached to an arm, $m$, of a rock-shaft, $n$. This rock-shaft is supported in proper bearings, and extends close up to one of the sliding timbers X, where a double crank (shown at Fig. 3, Sheet 4) is attached to its end, so that pins or projections $o$ and $p$ on the timber X will strike the cranks at each end of its stroke and automatically rotate the rock-shaft, so as to cause the sliding bar to move endwise in its bearing across the face of the plate.

The upper belt-shipper $i$ is pivoted at its middle near the upper edge of the plate $k$ and opposite one edge of the tight pulley, its clasp projecting above the upper edge of the plate, while its lower or lever end extends down at an angle and bears against the upper side of the sliding bar $l$. The lower shipper $i$ is secured in the same way to the plate near its lower edge, but opposite one edge of one of the loose pulleys. Its clasp projects below the lower edge of the plate, while its opposite or lever end extends upward and bears against the under side of the sliding bar $l$.

In the middle of the bar $l$ a notch or recess, $m'$, is made on the upper and under sides, opposite each other, in which the ends of the shippers are caught and carried alternately, as follows:

A slight spring, $n'$, is attached to the plate $k$ on each side of each of the shipper arms or levers, so as to insure the engagement of their extremities or points with the notches in the sliding bar—say, for instance, that the upper shipper is standing opposite the tight pulley, so that its belt is running on the tight pulley, while the lower shipper is opposite the loose pulley, and the sliding frame X is moving down, as shown in Fig. 1, Sheet 4. In this position the lower extremity of the upper shipper is in the notch $m'$, while the upper extremity of the lower shipper bears against the under side of the bar $l$ in a locked position. When the sliding frame X reaches the end of its stroke the upper projection, $o$, will strike the crank on the end of the rock-shaft, and cause it to rotate and carry the sliding bar $l$ outward. The first movement of this bar causes the upper belt-shipper to carry its belt from the tight pulley to its loose pulley, when the end of its lever will leave the notch $m'$ and be locked on the bar. At the same instant the end of the lever of the lower shipper will enter the notch $m'$, so that the further movement of the sliding bar will throw the belt from the opposite loose pulley onto the tight pulley, as shown in Fig. 2, Sheet 4. Thus the shippers are operated in alternation each way, so that each belt is shipped from the tight pulley onto its loose pulley before the other starts to move onto the tight pulley.

The crank shown at Fig. 3, Sheet 4, which is secured on the end of the rock-shaft $n$, has two shoulders on it, one of which is shorter than the other. The projection $p$ on the lower end of the sliding timber X is fixed and immovable, while the upper projection, $o$, is adjustable up and down in a slot in the timber, so as to admit of the length of the stroke being regulated. The lower or fixed projection is set a little outside of the upper one, so that it will miss the short arm and strike the long arm of the crank when the sliding frame is elevated, thus moving the rock-shaft in one direction, while the upper or movable projection strikes the short arm when frame is lowered, thus moving the rock-shaft in an opposite direction. Thus it will be seen that the movement of the vertical digging-frame operates the belt-shipper at each end of its stroke, so that the motion of the pulley-shaft and driving-gears are reversed automatically to drive the digging-frame continuously in opposite directions.

On the outer end of each shaft J a ratchet, $q$, is secured, the teeth of which rake in opposite directions. A bent lever, $r$, is pivoted on the end of each shaft outside of the ratchet, the short arm of which extends outward, while the long arm projects inward, as shown in Fig. 3, Sheet 1. To the extremity of the short arm a pawl, $s$, is pivoted, so as to engage with the teeth of the ratchet when the long arm is lowered and the short arm is raised. The weight of the long arm is sufficient to cause it to drop and lift the pawl into engagement with the ratchet. A cord, $t$, is attached to the long end of the lever, and passes up through the timber above, and thence forward, within convenient reach of the engineer. By drawing upon this cord the long end of the lever is raised, so that by securing the cord when the lever is thus raised the lever and pawl are thrown permanently out of operation. A pin, $a'$, projects from the lower end of the sliding frame X, opposite the long arm of each lever, so as to strike it when the frame is raised to the desired point.

When the machine is in operation only one of these levers is in operation at a time, the other being triced up out of reach of the pin $a'$. Considering therefore that one of the levers is thus triced up, as the frame X rises the pin $a'$ strikes and forces the long arm of the lever upward at the same time that the lower projection, $p$, strikes the crank of the rock-shaft to operate the belt-shifter. The long arm of the lever hangs down at an angle, so that the pin starts to move the lever upward slowly, and as the lever approaches the horizontal it is moved more quickly. The pawl $s$, being engaged with the ratchet $q$, the lifting of the lever causes the shaft J to partially rotate, causing the toothed wheel K to travel a short distance along the rack B, thus carrying the machine far enough to one side to cause the digger on the lower end of the digging-frame to take a new cut. When the machine has traveled in this manner across the end of the boat in one direction, the lever is triced up and the one on the opposite side lowered, so that the machine is moved automatically and intermittently back in an opposite direction across the width of the boat.

The digger can be made in any desired shape or form, and it can be attached either to the lower end of the sliding frame X or to a hinged supplemental frame, $p'$. I have in the present instance represented a spade which is bent at right angles, and which is attached to the supplemental frame. This supplemental frame, as stated, is hinged to the middle of the sliding frame, so that it can be swung around from one side to the other and fastened by pins $q'$.

This arrangement is necessary, in order to adjust the spade to the suction-mouth when it is turned to face in either direction, the frame $p'$, with its spade, being turned also to correspond, so that the earth loosened by it will fall directly in front of the suction-mouth, so as to be taken up by it.

This arrangement and operation are only required when the digger is used.

In many cases, especially when the bottom to be dredged is soft, the digging-frame can be thrown out of gear, and the machine, with the mouth of the suction-pipe set in the proper direction, can be moved continuously back and forth from side to side, so as to carry the mouth of the suction-pipe against the material to be dredged. When this is done I employ a separate device for driving the carriage. It consists of a short shaft, $b'$, which has a pulley, $c'$, on its upper end, and a worm or screw, $d'$, on its lower end. This shaft is mounted in an upright position in a box, $e'$, which is journaled in suitable bearings outside of the timber G and alongside of the shaft J. A worm-wheel, $f'$, is secured upon the shaft J opposite the lower or worm end of the shaft. A set-screw, $g'$, passes through the frame, in which the box $e'$ is mounted, so as to press against the upper end of the box, while another set-screw, $h'$, passes through it, so as to press against the lower end of the box. By retracting the lower set-screw and tightening the upper one the box is tilted, so as to disengage the worm or screw from the worm-wheel, in which position it stands when the machine is being fed intermittently by the ratchet, pawl, and lever before described; but when the machine is to be moved in a continuous manner I trice up both levers, $r$, so as to prevent them from operating. I then loosen the upper set-screw, $g'$, and tighten the lower one, $h'$, so as to set the worm in gear with the worm-wheel $f'$. I then carry a belt from an engine on the boat around the pulley $c'$, so as to run the shaft J continuously, thus driving the machine across the width of the boat, first in one direction and then in the other, by reversing the direction of the movement of the belt.

By this arrangement I am able to employ a rigid or inflexible upright suction-pipe, the moving carriage carrying it along as circumstances require. I am also able to use a digging device which maintains its proper relation to the mouth of the suction-pipe at all times, so that the material is loosened at the proper point and delivered directly into the suction-mouth. It also enables me to cut a path or channel which is as wide or wider than the boat, so that as the boat progresses it will move in the channel prepared for it.

The entire operation is simple, automatic, powerful, easily controlled, and better adapted for dredging purposes than the flexible-pipe arrangement heretofore used.

Having thus described my invention, what I claim, and desire to secure by Letters Patent, is—

1. The carriage F G H I, supported by wheels L on the edge of the curved or rounded end of the boat or vessel, and connected by the pipe-extension D with the suction-pipe C by a flexible joint, in combination with the shaft J, with its toothed wheel K, ratchet $q$, lever $r$, pawl $s$, the pin $a'$ on the sliding frame X, and the curved rack on the edge of the vessel, all combined and operated substantially as described.

2. The elbow-shaped mouth-piece R, provided with the toothed ring S, in combination with the sliding rod T, arranged to slide through bearings on the pipe $D^2$, and provided with the toothed wheel $u$ on its lower end, the upper end of said rod passing through the hand-wheel V on a feather, substantially as and for the purpose specified.

3. The mouth-piece R, provided with the toothed ring S, with its pin-holes, in combination with the spring-pin $S^1$ and cord $V^2$, substantially as and for the purpose described.

4. In a dredging-machine adapted to operate by suction, the combination of a digger operating by a vertical stroke, a sliding frame actuating the digger independently of the suction-pipe, the wire rope Y, drum $a$, pulley-shaft $g$, and intermediate gearing for transmitting the power applied to said pulley, as set forth.

5. The tight pulley $h$, having a loose pulley, $h'$, on each side of it, in combination with the belt-shippers $i$ $i$, pivoted above and below a sliding rod in which a notch, $m'$, is made, and the mechanism by which said rod is operated by the motion of the digging-frame, substantially as and for the purpose described.

6. The carriage F G H I, having a shaft, J, mounted in boxes across each end, said shaft having the toothed wheel K at one end, arranged to travel on the rack B, and having the ratchet $q$ on its outer end, in combination with the bent lever $r$, with its pawl $s$, and the pin $a'$, on the sliding frame X, substantially as and for the purpose described.

7. The shaft J, with its worm-wheel $f'$, in combination with the short upright shaft $b'$, mounted in a journaled box $e'$, and the set-screws $g'$ $h'$, combined and arranged to operate substantially as specified.

8. The vertical suction-pipe $D^2$ and M, with its mouth-piece R, in combination with a spade or digger attached to and operated by a vertically-reciprocating frame or slide, X, substantially as above described.

9. The vertical suction-pipe $D^2$ and M, with its adjustable mouth-piece R, in combination with the adjustable digger-frame $p'$, hinged to the vertically-sliding frame X, and its locking-pins $q'$, substantially as and for the purpose specified.

10. The improved arrangement for packing the joint between the stationary and sliding suction-tubes, consisting of a flexible ring or band, $S^2$, secured around the lower end of the stationary pipe, so as to overlap or clasp the moving pipe and cover the joint, substantially as specified.

In witness whereof I hereunto set my hand and seal.

STEPHEN WILLIAM SHAW. [L. S.]

Witnesses:
   WM. FLOYD DUCKETT,
   D. B. LAWLER.